(12) United States Patent
Kawamoto

(10) Patent No.: US 7,916,673 B2
(45) Date of Patent: Mar. 29, 2011

(54) COMMUNICATION APPARATUS AND METHOD FOR CONTROLLING COMMUNICATION CHANNEL USED

(75) Inventor: Yasutaka Kawamoto, Osaka (JP)

(73) Assignee: Oki Electric Industry Co., Ltd., Toyko (JP)

( * ) Notice: Subject to any disclaimer, the term of this patent is extended or adjusted under 35 U.S.C. 154(b) by 87 days.

(21) Appl. No.: 12/320,512

(22) Filed: Jan. 28, 2009

(65) Prior Publication Data
US 2009/0190608 A1  Jul. 30, 2009

(30) Foreign Application Priority Data
Jan. 29, 2008  (JP) .................................. 2008-017994

(51) Int. Cl.
*H04B 7/00* (2006.01)
(52) U.S. Cl. ........................................ 370/310; 370/465
(58) Field of Classification Search .................. None
See application file for complete search history.

(56) References Cited

U.S. PATENT DOCUMENTS

| 6,665,017 | B1 * | 12/2003 | Raiyat ........................... 348/468 |
| 7,251,231 | B2 * | 7/2007 | Gubbi ........................... 370/336 |
| 2003/0108111 | A1 * | 6/2003 | Miwa ........................... 375/259 |
| 2005/0204247 | A1 * | 9/2005 | Guo et al. ..................... 714/746 |

FOREIGN PATENT DOCUMENTS

JP   2005-142815   6/2005

* cited by examiner

*Primary Examiner* — Min Jung
(74) *Attorney, Agent, or Firm* — Rabin & Berdo, P.C.

(57) ABSTRACT

A sender communication device includes a communication unit for sending a communication signal to a receiver communication device, and a communication controller for controlling setting of communication channels used for the communication unit as well as for setting, when sending the communication signal, a sending period of the communication signal substantially not shorter than a receive confirmation period of all communication channels in the receiver communication device. A receiver communication device includes a communication unit for receiving the communication signal sent from the sender communication device while switching over plural communication channels, and a communication controller for controlling switching of the communication channels and for setting a communication signal receive-waiting opportunity, in which a first communication channel is used, substantially higher than a receive-waiting opportunity, in which a second communication channel is used. It is thus possible to avoid radiowave interference while saving electric power and lowering delay.

19 Claims, 10 Drawing Sheets

COMMUNICATION APPARATUS AND METHOD FOR CONTROLLING COMMUNICATION CHANNEL USED

BACKGROUND OF THE INVENTION

1. Field of the Invention

The present invention relates to a communication apparatus, and more specifically to a communication apparatus for use in a short-distance wireless communication system. The present invention also relates to a method and a computer program for use in such a communication apparatus.

2. Description of the Background Art

Recently, along with a growth of short-distance wireless communication technologies, it is required in various fields to utilize PANs (Personal Area Networks) relying upon such grown communication technologies.

For example, traditionally, infrared transmission is utilized for a communication instrument for remote control manipulation of television (TV) receivers and other devices. However, the infrared transmission has a strong directivity. Thus, the user has to direct a remote control handset to an object to be manipulated. If an obstacle exists on the transmission path from the handset to the object, no transmission may be available.

Instead, application of a short-distance radio communication device to remote control makes remote control available even when an obstacle intervenes on the transmission path.

As a typical standard for short-distance wireless communication form, the IEEE (Institute of Electrical and Electronics Engineers, Inc.) 802.15.4 has been presented. The IEEE 802.15.4-based communication uses a 2.4 GHz bandwidth, which is called the ISM band (Industrial Scientific Medical Band) and shared with, for example, microwave ovens and wireless LANs (Local Area Networks) The communication using the IEEE 802 has a radiowave output comparatively weaker than, for example microwave ovens and wireless LANs.

Thus, under the situation where other devices such as microwave oven and wireless LAN emit radiowaves, the communication with the IEEE 802.15.4 may suffer radiowave interference from those devices and fail in connection.

For example, Japanese patent laid-open publication No. 2005-142815 discloses a communication technology available even under radiowave interference as described above.

Communication between wireless communication devices generally needs the same channels shared by both sender and receiver communication devices. Normally, before communication starts, the sender and receiver communication devices negotiate with each other about communication channels according to various methods.

The Japanese '815 publication also teaches a technology in which, if communication fails due to radiowave interference, the sender communication device changes a communication channel to be used for retransmitting data. Specifically, the receiver communication device scans all channels while waiting for responses, and the sender communication device in turn sends, before data transmission, multiple times a preamble including a destination address. In this way, the receiver communication device uses a channel on which it received the preamble to proceed to data communication.

The conventional art in the Japanese '815 publication however has problems as described below when applied to a remote control communication instrument, for instance.

As described above, according to the technology in the Japanese '815 publication, the receiver communication device has to scan all channels as well as frame, or byte, synchronization. Furthermore, the sender communication device has to send a preamble multiple times. Thus, the conventional art, if applied to a remote control communication method, has a problem in that good responsiveness cannot be offered.

In addition, in a TV remote control system, for example, a TV receiver set works also as a receiver communication device for remote control. The application of the conventional art to the TV receiver set acting as a remote control receiver device allows its power consumption to be reduced. However, the TV set itself consumes a large power in its units other than the remote control circuitry. As a result, such a TV receiver set fails to significantly save the whole power.

The above-mentioned problems arise not only in the case of a remote control communication device using a short-distance wireless communication but also in other cases, such as a PAN system with short-distance wireless communication and a wireless communication with a plurality of channels.

SUMMARY OF THE INVENTION

It is therefore an object of the present invention to provide a communication apparatus which can achieve electric power saving and low delay while avoiding a radiowave interference. It is also an object of the invention to provide a method and a computer program for such an apparatus.

In accordance with the present invention, a communication apparatus communicable with a receiver communication device comprises: a communication unit for using one of a plurality of communication channels for communication to send a communication signal to the receiver communication device; and a communication controller for controlling setting of communication channels used for the communication unit, and for setting, when sending the communication signal, a sending period of the communication signal substantially equal to or longer than a receive confirmation period of all the communication channels in the receiver communication device.

Further in accordance with the present invention, a communication apparatus communicable with a sender communication device comprises: a communication unit for receiving a communication signal sent from the sender communication device while switching over a plurality of communication channels, and a communication controller for controlling switching of the communication channels in the communication unit, and for setting a communication signal receive-waiting opportunity, in which a first communication channel is used which the sender communication device mainly utilizes, substantially higher than a communication signal receive-waiting opportunity, in which a second communication channel other than the first channel is used.

In accordance with the present invention, a method of communication with a receiver communication device comprises the steps of: selecting one of a plurality of communication channels for use in communication to transmit a communication signal to the receiver communication device; and controlling setting of the communication channels, and for keeping, when sending the communication signal, a sending period of the communication signal substantially equal to or longer than a receive confirmation period of all the communication channels set by the receiver communication device.

In accordance with the present invention, a method of communicating with a sender communication device comprises the steps of: receiving a communication signal sent from the sender communication device while switching over a plurality of communication channels; and controlling switching of the communication channels, and for setting a communication signal receive-waiting opportunity, in which a first communication channel is used which the sender communication device mainly utilizes, substantially higher than a receive-waiting opportunity of the communication signal, in which a second communication channel other than the first channel is used.

Still further in accordance with the present invention, a communication program executable on a computer for enabling a communication apparatus to function as: a communication unit for using one of a plurality of communication channels for communication to send the communication signal to a receiver communication device; and a communication controller for controlling setting of communication channels used for the communication unit, and for setting, when sending the communication signal, a sending period of the communication signal substantially equal to or longer than a receive confirmation period of all the communication channel in the receiver communication device.

In accordance with the present invention, a communication program executable on a computer for enabling a communication apparatus to function as: a communication unit for receiving a communication signal sent from a sender communication device while switching over a plurality of communication channels; and a communication controller for controlling switching of the communication channel in the communication unit, and for setting a communication signal receive-waiting opportunity, in which a first communication channel is used which the sender communication device mainly utilizes, substantially higher than a communication signal receive-waiting opportunity, in which a second communication channel other than the first channel is used.

Thus, according to the present invention, a wireless communication system using a plurality of channels can avoid a radiowave interference while achieving electric power saving and lower delay.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

A preferred embodiment of a communication apparatus in accordance with the present invention will be described below with reference to the accompanying drawings. A communication apparatus according the illustrative embodiment is applied to, for example, a radio remote control system.

Figure 1:
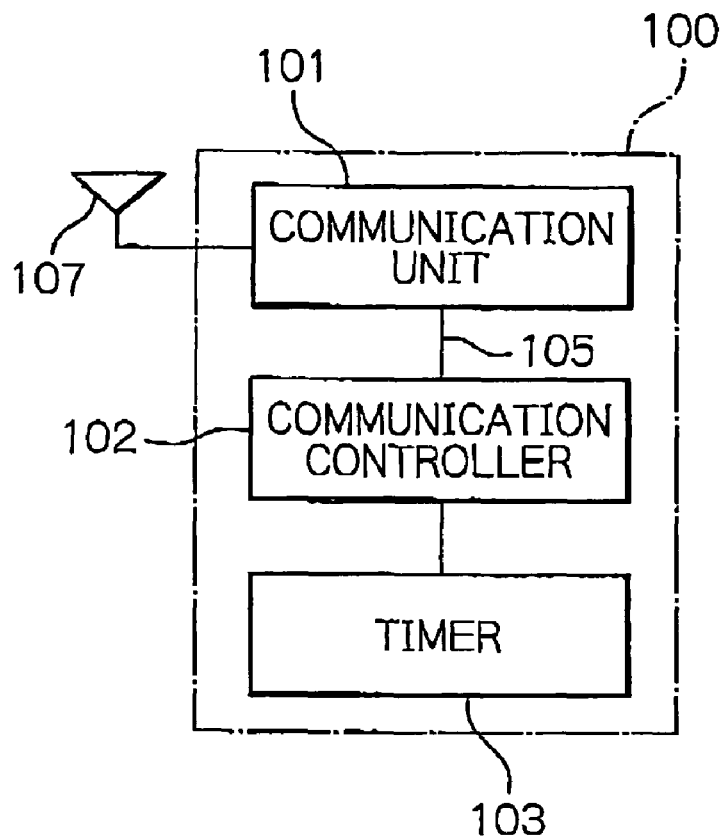
FIG. 1 is a schematic configuration block diagram illustrating an internal structure of a preferred embodiment of a wireless communication device serving as a sender in accordance with the present invention.

FIG. 1 depicts in a wireless communication device 100 of the preferred embodiment of the present invention. The communication device 100 comprises a communication unit 101, a communication controller 102 connected with the communication unit 101, and a timer 103 connected with an input of the communication control unit 102. The wireless communication device 100 shown in FIG. 1 may be installed in an operating device such as a remote controller handset manipulable by the user.

The communication unit 101 is operative in response to control signals received from the communication controller 102 connected to its input 105 to perform wireless, e.g. radio with the illustrative embodiment, communication with other wireless communication device through an antenna 107. In the description, signals are designated with reference numerals of connections on which they are conveyed. The communication unit 101 may be implemented as, for instance, a short-distance wireless communication device having its communication distance of up to, about 100 meters, such as ZigBee (trademark), MWB (Ultra Wide Band), Bluetooth (trademark), WiFi (Wireless Fidelity) and wireless LAN. The communication unit 101 sends a communication signal including a bit synchronous signal and a data signal to other receiver wireless communication devices which may have the like structure of the communication device 200. More specifically, the communication unit 101 transmits a bit synchronous signal to such other receiver wireless communication device before starting data transmission, and then sends a data signal to the other communication device.

The communication controller 102 having its output connected with the control input 105 of the communication unit 101 is adapted to send a control signal to the communication unit 101 for controlling the communication processing of the communication unit 101. The communication controller 102 keeps a transmission period of the bit synchronous signal substantially equal to or longer than a period of bit synchronous signal receive-waiting time for all channels used in the receiver wireless communication device 200.

More specifically, the receiver wireless communication device 200 sequentially scans all channels for receive-waiting on those channels. In this embodiment, during a time substantially equal to or longer than one cycle of scanning all channels in the receiver communication device 200, the sender wireless communication device 100 sends the bit synchronous signal.

Figure 2:
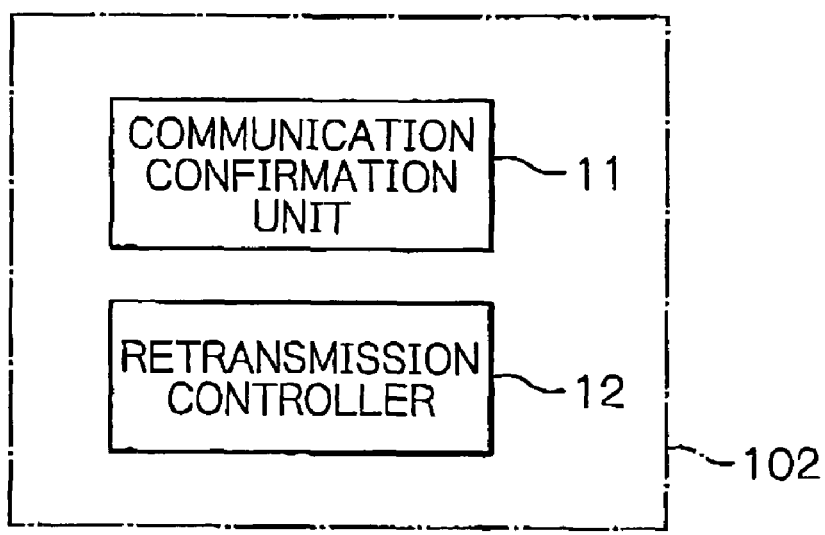
FIG. 2 is a schematic block diagram illustrating configuration elements and functions of the communication controller shown in FIG. 1.

Now with reference to FIG. 2, the communication controller 102 may include a communication confirmation unit 11, which is adapted to check whether or not a data signal communication has normally been performed and then generates either a confirmation or a confirmation-failure signal.

The communication controller 102 may also include a retransmission controller 12. If the retransmission controller 12 receives a confirmation-failure signal from the communication confirmation unit 11, the controller 12 indicates the communication unit 101 to change the used communication channel, and then retransmits the data signal on the changed communication channel.

The timer 103, FIG. 1, is adapted to count the time to provide the communication controller 102 with timer information.

Figure 3:
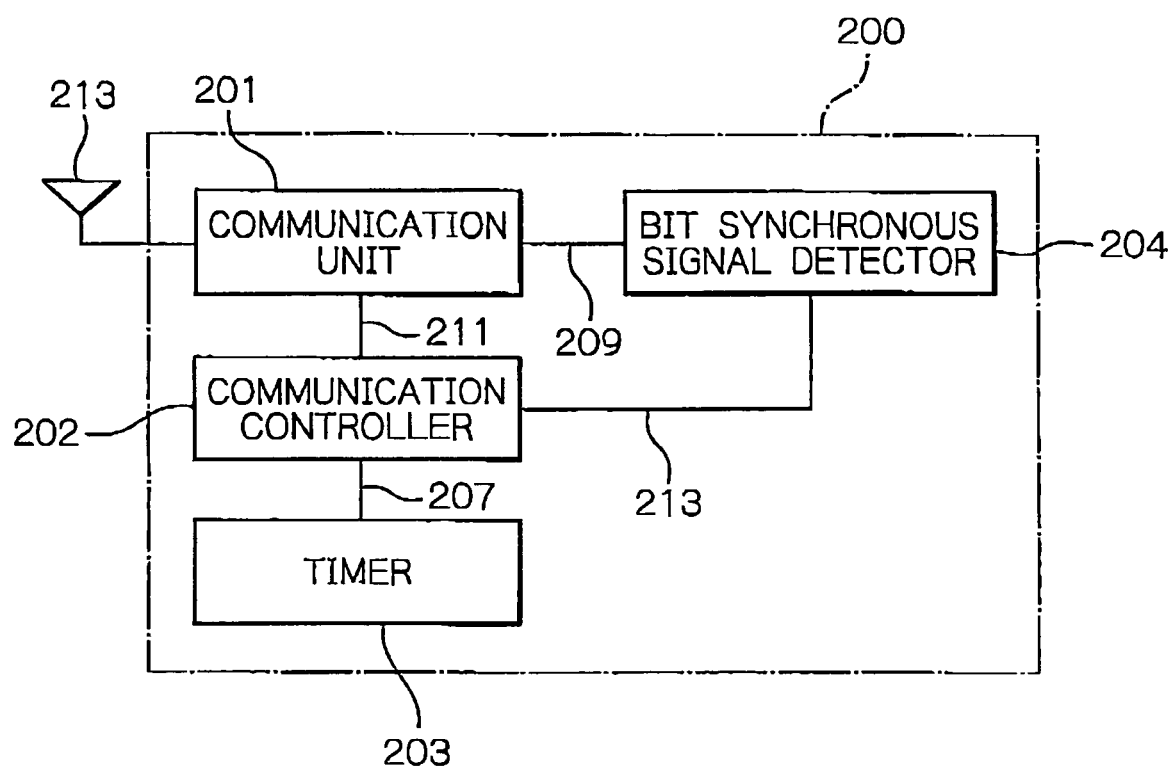
FIG. 3 is a schematic configuration block diagram illustrating an internal structure of a preferred embodiment of a wireless communication device serving as a receiver in accordance with the present invention.

In FIG. 3, the wireless communication device 200 according to this embodiment includes a communication unit 201, a communication controller 202 connected with the communication unit 201, a timer 203 connected with an input 207 of the controller 202, and a bit synchronous signal detector 204 connected with an output 209 of the communication unit 201 and an input of the controller 202. As an example, the wireless communication device 200 may be built as a remote-control receiver equipment such as part of a TV receiver set.

The communication unit 201 is responsive to a control signal received from the communication controller 202 connected with its input 211 to perform wireless, e.g. radio, communication with other wireless communication devices having the like structure of the communication device 100 through an antenna 213. The communication unit 201 has its output 209 connected with an input of bit synchronous signal detector 204 to send signals received from the wireless communication device 100 to the bit synchronous signal detector 204. Like the communication unit 101 in the sender wireless communication device 100, the communication unit 201 may be implemented as a short-distance wireless communication device such as ZigBee (trademark), UWB, Bluetooth (trademark), WiFi, and wireless LAN.

The communication controller 202 having its output 211 connected with the control input of the communication unit 201 is adapted to send a control signal to the communication unit 201 in order to control the communication processing of the communication unit 201 so that each of all the channels is allotted to a specific receive-waiting time to be sequentially scanned. Furthermore, the communication controller 202 has its input 213 connected with an output of the bit synchronous signal detector 204 to receive the bit synchronous signal detected by the detector 204 to perform, in response to the bit synchronous signal, a bit synchronization to process a data signal reception.

The timer 203 is adapted to count the time and provide the communication controller 202 with timer information.

The bit synchronous signal detector 204 is responsive to a received signal 209 provided by the communication unit 201 to detect a bit synchronous signal. Further, the bit synchronous signal detector 204 is adapted to transfer the bit synchronous signal 213 thus detected to the communication controller 202.

With the above described configuration according to the present embodiment, it may be said that the sender and receiver wireless communication devices 100 and 200 form in pair a wireless communication system on which both transmission and reception are available.

Figure 4:
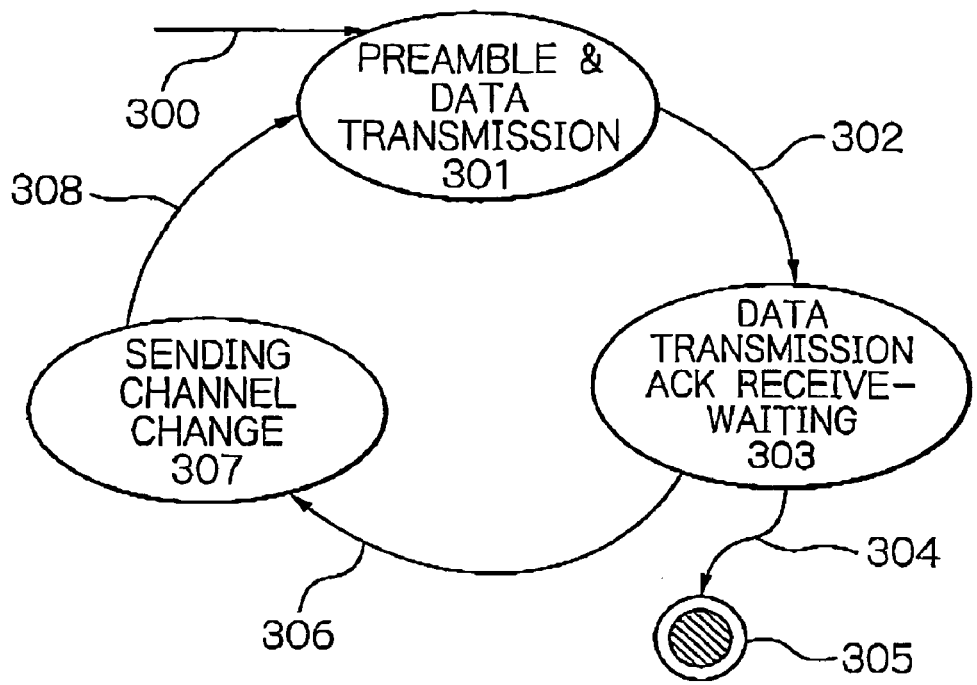
FIG. 4 is a state transition diagram illustrating processing steps of the embodiment shown in FIG. 1.
Figure 5:
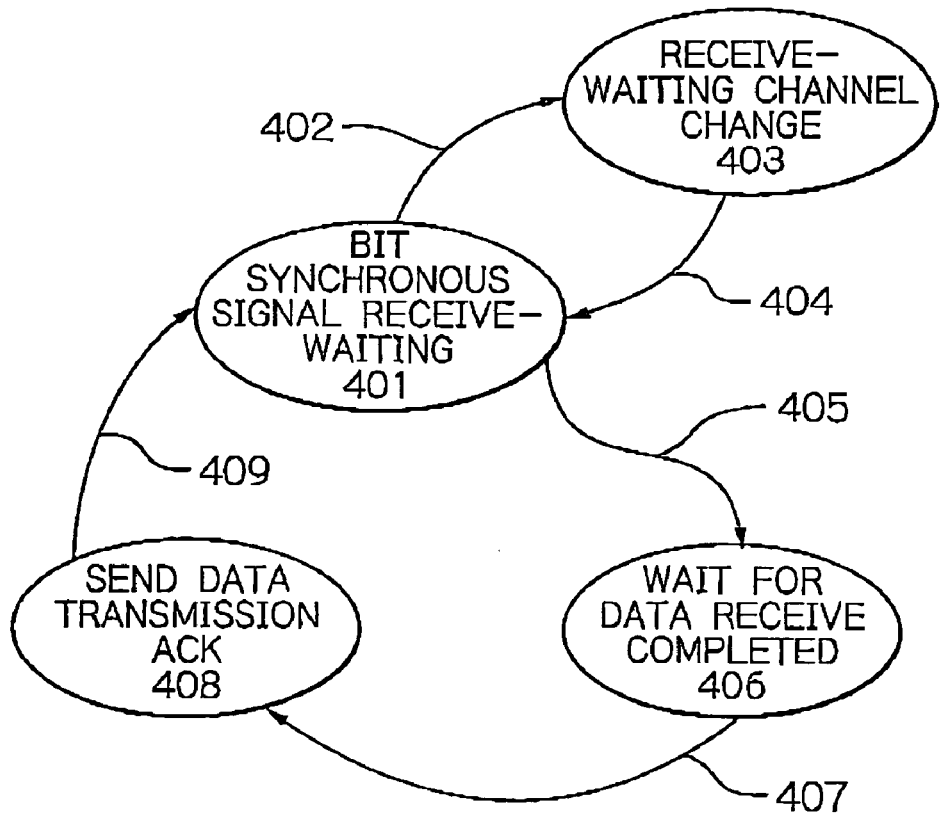
FIG. 5 is also a state transition diagram illustrating processing steps of the embodiment shown in FIG. 3.

Now, the operation of wireless communication processing according to this illustrative embodiment will be detailed referencing FIGS. 4 to 7. FIG. 4 is a state transition diagram of the sender wireless communication device 100. FIG. 5 is a state transition diagram of the receiver wireless communication device 200. Firstly, in reference to FIG. 4, the processing of the sender wireless communication device 100 will be described below.

For example, a specific remote control operation by the user, such as a depression of a remote control switch button, not shown, depicted with the arrow indicative of a state transition 300 causes an operation signal to be provided to the communication controller 102. Receiving the operation signal, the communication controller 102 enables the communication unit 101 to activate the data signal transmission processing (state 301).

The communication unit 101, when instructed by the communication controller 102, uses either one of sending channels to transmit a bit synchronous signal, or preamble, and subsequently a data signal. The communication controller 102 also makes the communication unit 101 send the bit synchronous signal continuously for a period of time which is substantially equal to or longer than required for scanning all channels in the receiver communication device 200.

After the data signal has been transmitted (state transition 302), operation is controlled by the communication controller 102 into a state 303 of waiting for a reception of data transmission ACK (ACKnowledgement) signal. Then, in response to entering the data transmission ACK signal receive-waiting state 303, the timer 103 starts counting.

Before the timer 103 times out, if a data transmission ACK signal returned from the receiver communication device 200 has been received (transition state 304), the communication confirmation unit 11 in the communication controller 102 determines that the communication channel suffers no radio-wave interference and data transmission is normally completed, and then produces a confirmation signal. Then, the communication controller 102 that has received the confirmation signal closes the transmission processing (state 305).

To the contrary, if no data transmission ACK signal is received from the receiving side to cause a timeout (transitional state 306), then the communication confirmation unit 11, since unable to determine that data transmission is normally completed, transfers a confirmation-failure signal to the retransmission controller 12 in the communication controller 102. The retransmission controller 12 that has received the confirmation-failure signal instructs the communication unit 101 to change a communication channel to be used (state 307). After completing the change of the used channel (state 308), the wireless communication device 100 moves back to the state 301 so as to retransmit the data signal on the communication channel thus changed.

To changing a communication channel by the communication controller 102, various methods are applicable. For example, applicable are a method for selecting a channel that has its bandwidth remotest from the channel that fails then in communication, or another method for setting a channel in a predetermined order.

Next, with reference to FIG. 5, a processing by the receiver wireless communication device 200 will be described below. In the receiver wireless communication device 200, the communication controller 202 changes a channel constantly or periodically while waiting for a bit synchronous signal received.

At first, the communication controller 202 starts waiting for a bit synchronous signal from predetermined one of the channels (state 401). Then, upon entering the bit synchronous signal receive-waiting mode, the timer 203 starts counting the time. If a timeout occurs (transition state 402), the current channel changes over to the next (state 403). If the receive-waiting channel has been changed (transition state 404), the operation moves back to state 401, in which a receipt of a bit synchronous signal is waited for on that channel.

In the transitional state 402, the communication controller 202 adjusts a timeout value such that the value becomes satisfactorily shorter than the preamble period defined by the sender communication device 100.

The communication controller 202 thus constantly repeats the processing in states 401 to 404.

Then, before timed out, if a signal is received from the sender wireless communication device 100 and the bit synchronous signal detector 204 detects the bit synchronous signal (state 405), then the communication controller 202 receives the data signal that follows the bit synchronous signal (state 406). If the communication controller 202 completes the data reception (state 407), then the communication unit 201 transmits, under the control of the communication controller 202, a data transmission ACK signal toward the sender communication device 100 (state 408).

Thereafter, if the data transmission ACK signal has been transmitted (transition state 409), the operation moves back to state 401 where a bit synchronous signal receive-waiting is taken on another channel.

Figure 6:
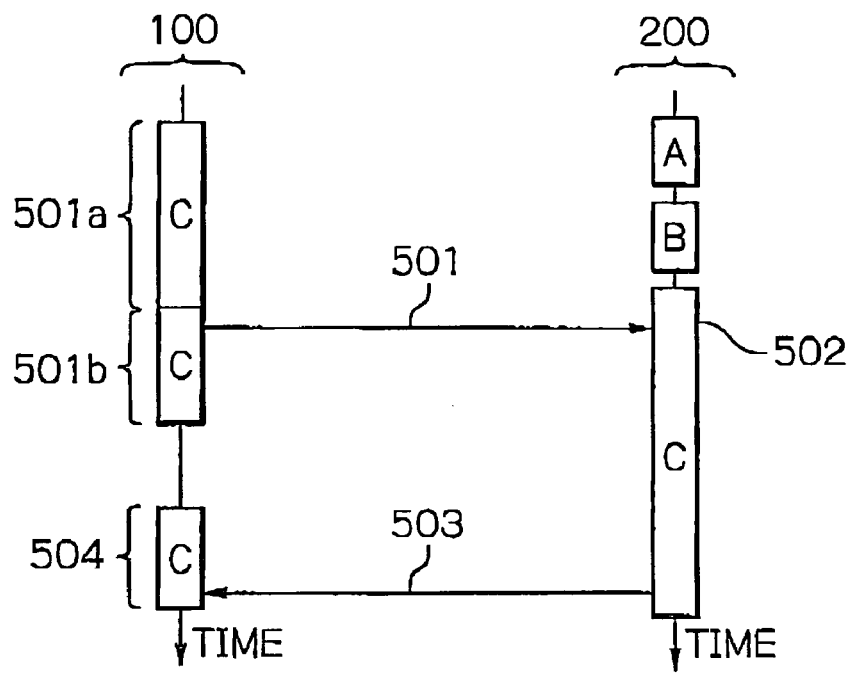
FIG. 6 shows a communication sequence in a case in which the illustrative embodiment successfully performs communication between the sender and receiver communication devices.
Figure 7:
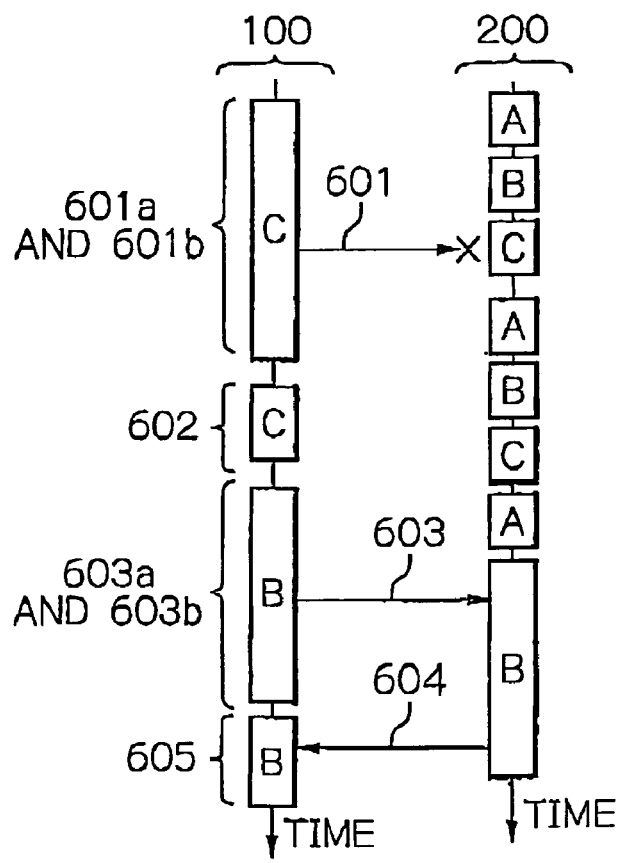
FIG. 7 shows a communication sequence in a case in which the illustrative embodiment fails in communication between the sender and receiver communication devices.

FIG. 6 shows a communication sequence in which communication between both the sender and receiver communication devices 100 and 200 of this embodiment is successfully performed. FIG. 7 shows a communication sequence in which communication between both the communication devices 100 and 200 fails. In FIGS. 6 and 7, letters "A", "B" and "C" indicated in the processing in the sender and receiver communication devices designate channels.

In FIG. 6, on one hand, the receiver communication device 200 changes a channel to be used sequentially in the order of "A", "B" and "C" for waiting for a reception of a bit synchronous signal. On the other hand, the sender communication device 100 uses the channel "C" for data transmission.

The sender wireless communication device 100, under the control of the communication controller 102, sends a bit synchronous signal 501a continuously over the channel "C". After the predetermined time elapses, under the control of the communication controller 102, a data signal 501b is sent (step 501).

In this case, the sender wireless communication device 100, after having sent the data signal, counts a receive-waiting time 501c for a data transmission ACK signal expected to be received.

If the receiver wireless communication device 200 detects the bit synchronous signal sent from the sender communication device 100, then it will subsequently receive a data signal (step 502).

When the receiver wireless communication device 200 completes the data signal receive processing, a data transmission ACK signal 503 is returned to the sender communication device 100 (step 503).

Then, if the sender wireless communication device 100 receives the data transmission ACK signal 503 during data transmission ACK signal receive-waiting time 504, then the data communication over the channel will successfully be performed.

Similarly, in FIG. 7, on one hand, the receiver communication device 200, while changing channels in the order of "A", "B" and "C", performs a bit synchronous signal receive-waiting operation. On the other hand, the sender communication device 100 uses at first the channel "C" for data transmission.

Similarly to the case shown in FIG. 6, the sender wireless communication device 100 uses the channel "C" to send a bit synchronous signal 601a and a data signal 601b (step 601).

In the case shown in FIG. 7, it is assumed for illustration that radiowave interference occurs with another device, not shown, causing data communication to be failed on the channel "C". In that case, the receiver communication device 200 fails to normally detect the bit synchronous signal 601a from the sender communication device 100, and accordingly transmits no data transmission ACK signal.

Thus, the sender communication device 100 fails to receive a data transmission ACK signal during the data transmission ACK signal receive-waiting period 602, causing the time period to expire (step 602).

Thence, the sender wireless communication communication device 100 changes a sending channel under the control of the communication controller 102 preferably having the retransmission controller 12. In this example, the channel changes from "C" to "B". The order of changing a sending channel may be specified in advance, for example, to the order of "C", "B", "A".

If the sender wireless communication device 100 completes a change of the sending channel, then, under the control of the communication controller 102, a bit synchronous signal 603a and a data signal 603b are sent over the channel "B" (step 603).

If the receiver wireless communication device 200 succeeds in communication over the channel "B", then, under the control of the communication controller 202, a data transmission ACK signal 604 is sent to the sender wireless communication device 100 (step 604). If the sender communication device 100 receives a data transmission ACK signal 604 during the data transmission ACK signal receive-waiting time 605, communication on the channel "B" is successful.

As described above, the receiver communication device, which may function as, for example, a remote controller installed in a TV receiver set, performs the bit synchronous signal receive-waiting operation while changing a channel constantly under the control of the communication controller 202.

The sender communication device 100 continuously sends, under the control of the communication controller 102, a bit synchronous signal to all channels in the receiver communication device 200 for a period of time continuing still after the bit synchronous signal receive-waiting period is completed, and if the communication fails, the communication channel for retransmission is changed preferably under the control of the retransmission controller 12.

In the way as described above, even if radiowave interference causes communication to be failed over one channel, communication can be maintained over another channel. In addition, since data are transmitted without involving address data packets, communication takes a shorter time than the conventional art. As a result, the invention is applicable to such applications requiring a quick response as a remote control system.

Now, an alternative embodiment according to the present invention will be detailed as an example of modification, referring to FIGS. 8 to 13. This alternative embodiment is also directed, similarly to the previously described embodiment, an example applied to a remote control communication instrument.

The sender and receiver wireless communication devices 100 and 200 according to the alternative embodiment may have the same internal structure as the illustrative embodiment shown in and described with reference to FIGS. 1, 2 and 3. Thus, this alternative embodiment will be described also with reference to the configuration diagrams of in FIGS. 1, 2 and 3.

The alternative embodiment may differ in structural elements and internal functions of the communication controllers 102 and 202 from the previously described embodiment. Thus, described below will mainly be functional characteristics of communication controllers 102 and 202 included in the sender and receiver wireless communication devices 100 and 200, respectively.

Figure 8:
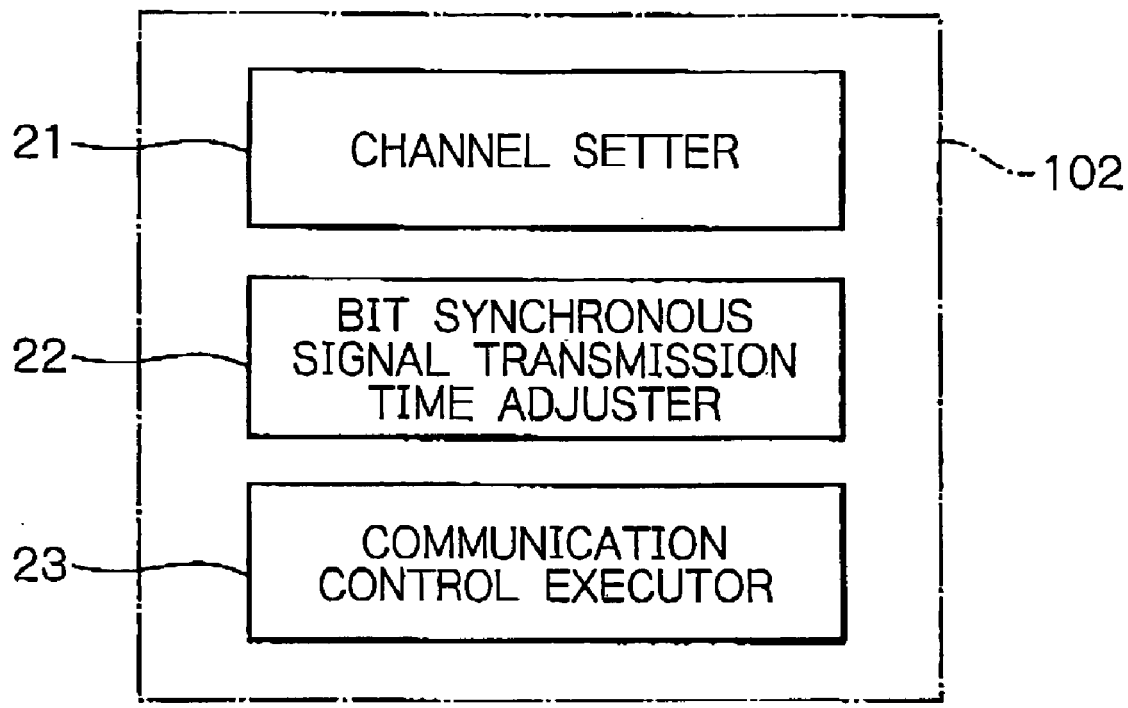
FIG. 8 is a schematic block diagram illustrating configuration elements and functions of the communication controller in an alternative embodiment of a wireless communication device serving as a sender in accordance with the present invention.

In FIG. 8, the communication controller 102 comprises a channel setter 21, a bit synchronous signal transmission time adjuster 22 and a communication control executor 23.

The channel setter 21 is adapted to set channels to be used for communication so that the currently used channel is set as a main channel and a remaining channel or channels as sub-channel or sub-channels. Further, the channel setter 21 uses the main channel for communication at first. If communication fails on the main channel, any one of the sub-channels is specified for use in communication.

The bit synchronous signal transmission time adjuster 22 is adapted to adjust a transmission period of time for a bit synchronous signal according to a channel used for communication. The adjuster 22, when using the main channel, sets the bit synchronous signal transmission duration substantially equal to or longer than a time within which the receiver communication device 200 has its receive-waiting time on the main channel expired, and, when using a sub-channel, sets the bit synchronous signal transmission duration substantially longer than the transmission time consumed using the main channel.

As described later, in the receiver communication device 200, the receive-waiting time of the main channel is set substantially longer than that of the sub-channel. As a result, the bit synchronous signal transmission duration, when using the main channel, can be set shorter in transmission duration than the bit synchronous signal 501a, FIG. 6, of the previously described embodiment.

The communication control executor 23 is adapted to control the communication unit 101 in the communication processing. More specifically, the communication unit 101 is designed to use a channel that is set to execute a transmission processing. The communication control executor 23 preferably includes a structure and function with which the communication controller 102 of the previous embodiment is equipped, i.e. the structure and function corresponding to:

the communication confirmation unit 11 for checking a data signal communication result, and sending a signal representing whether or not confirmation is available; and the retransmission controller 12 for changing a communication channel if no confirmation is available, and using the changed communication channel for data signal retransmission.

Figure 9:
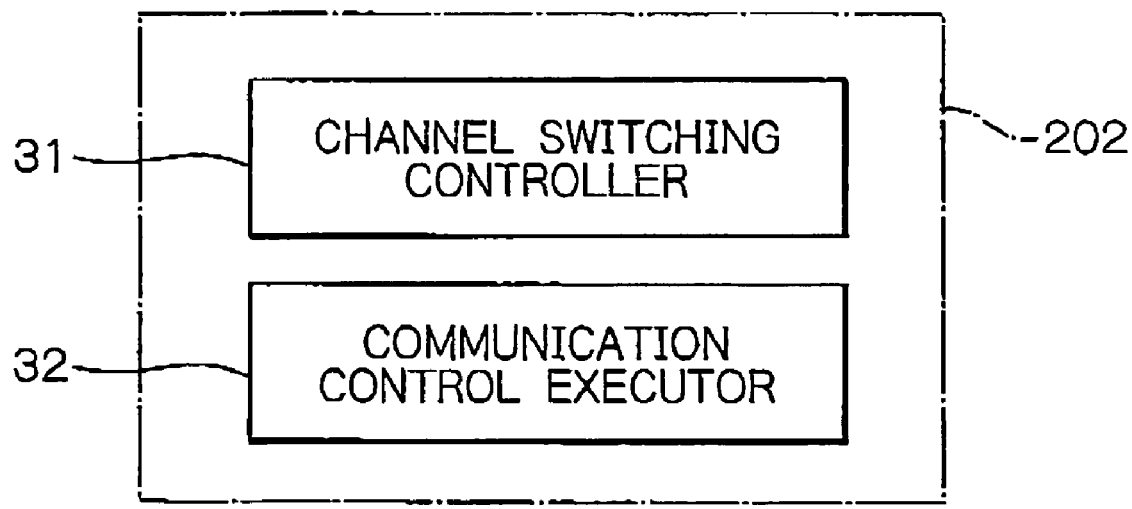
FIG. 9 is also a schematic block diagram illustrating configuration elements and functions of the communication controller in an alternative embodiment of a wireless communication device serving as a receiver communication device in accordance with the present invention.

In FIG. 9, the communication controller 202 of the alternative embodiment mainly includes at least a channel switching controller 31 and a communication control executor 32.

The channel switching controller 31 functions as switching over all channels at a predetermined receive-waiting time interval for performing receive-waiting operation for each of the channels.

In the alternative embodiment, the channel switching controller 31 performs a switching control so as to keep the receive-waiting time of the main channel longer than that of the sub-channels.

For example, if three channels "A", "B" and "C" are available which would have the receive-waiting time thereof set substantially equal to each other, then normally in order to balance the receive-waiting time between all the channels, channel switching would be performed cyclically in the order of channels "A", "B", "C", "A" and so on.

In the alternative embodiment, however, when, for example, the channel "A" is the main channel, in order to give the channel "A" a longer receive-waiting time period, the channels are switched cyclically in the order of "A", "B", "A" "C", "A" and so on. With this alternative embodiment, the channel "A" can thus set the receive-waiting time longer than the remaining channels "B" and "C".

The communication control executor 32 performs receive processing on a data signal received if a bit synchronous signal is detected.

Figure 10:
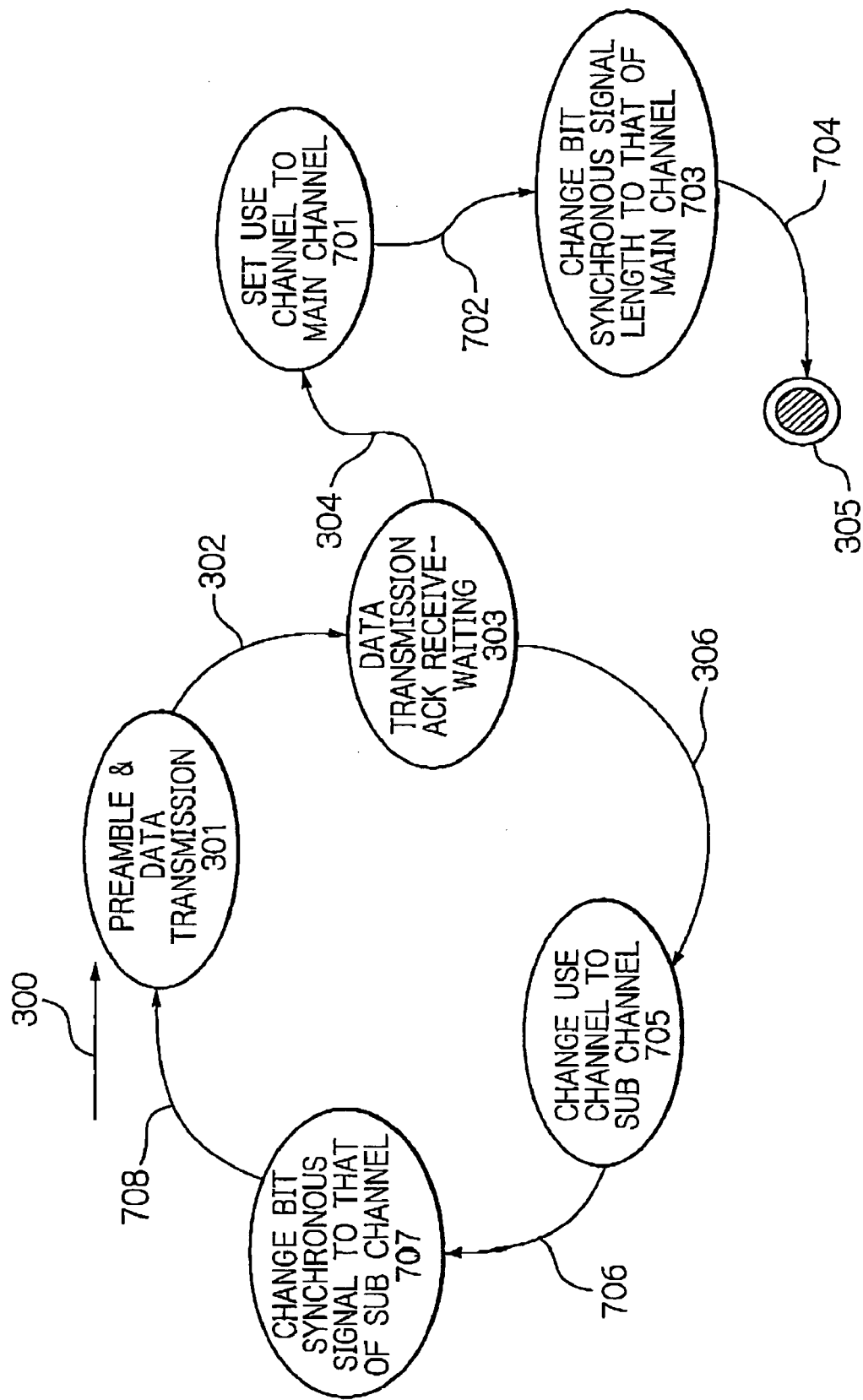
FIG. 10 is a state transition diagram illustrating processing steps of the alternative embodiment of the wireless communication device serving as a sender communication device.
Figure 11:
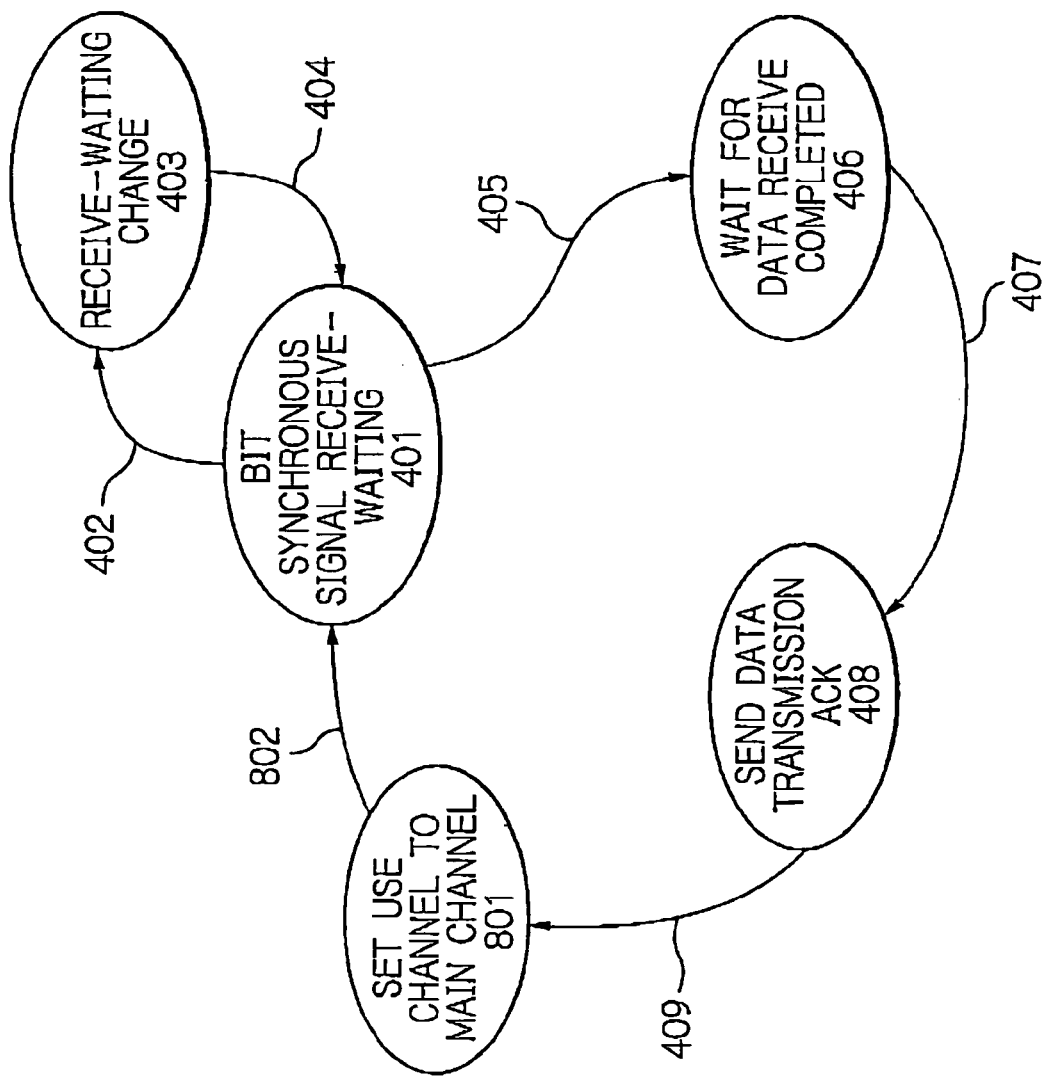
FIG. 11 is also a state transition diagram illustrating processing steps of the alternative embodiment of the wireless communication device serving as a receiver communication device.

What follows is a description of operation of wireless communication processing according to the alternative embodiment, with reference to further figures. FIGS. 10 and 11 are state transition diagrams of the sender wireless communication device 100 and the receiver wireless communication device 200, respectively.

At first, referring to FIG. 10, processing of the sender wireless communication device 100 will be described. In the figures, the same symbols or reference numerals designate corresponding or like components or processing.

If operation of the user causes an operation signal to be supplied to the communication controller 102 as depicted with the arrow 300, then, similarly to the previous embodiment, the communication controller 102 makes the communication unit 101 to activate the data signal transmission processing (state 301). After the data signal transmission is completed (state 302), the operation transfers to the data transmission ACK signal receive-waiting state (state 303) and at the same instant the timer 103 starts time-counting.

If, before timed out, reception of the data transmission ACK signal returned from the receiver communication device 200 is completed (state 304), the channel setter 21 sets the presently used channel as the main channel and the remaining channels as the sub-channels (state 701).

When the main channel and sub-channel setting is completed (state 702), the bit synchronous signal transmission time adjuster 22 changes the setting of the time period of a bit synchronous signal transmission, or bit synchronous signal length, to that for main channel (state 703). If the change of setting is completed (state 704), then, under the control of the communication control executor 23, the communication unit 101 performs the data signal transmission processing and exits the operation (state 305).

On the other hand, if a data transmission ACK signal fails to be received from the receiver communication device 200 to cause a timeout to occur (state 306), the communication controller 102, especially the channel setter 21, changes a channel by selecting available one of the sub-channels (state 705).

If the change of channel is completed (state 706), the bit synchronous signal transmission time adjuster 22 changes the setting of the bit synchronous signal transmission time length to that of the sub-channel after changed (state 707). If the change of bit synchronous signal length is completed (state 708), the operation moves back to state 301, and the communication control executor 23 uses the sub-channel to perform data signal transmission processing.

What follows is a description of processing of the receiver wireless communication device 200 with reference to FIG. 11. In the receiver wireless communication device 200, the communication controller 202, while changing regularly a channel through the channel switching controller 31, performs the bit synchronous signal receive-waiting operation. Repetitive description about the processing in states 401 to 404 is omitted since it is the same as the previous embodiment.

In the state 401, if, before timed out, the bit synchronous signal detector 204 detects a bit synchronous signal (state 405), then the communication controller 202, especially the communication control executor 32, performs the receiving process of a data signal, which follows the bit synchronous signal (state 406).

If data reception by the communication control executor 32 is completed (state 407), under the control of the communication controller 202, the communication unit 201 sends out a data transmission ACK signal to the sender communication device 100 (state 408).

Thereafter, the data transmission ACK signal has been sent out (state 409), and then the communication controller 202 sets the channel used as the main channel and also sets the remaining channels as the sub-channels (state 801). Then, the main channel and sub-channels have been set (state 802), the control moves back to state 401, in which bit synchronous signal receive-waiting processing will be performed on a separate channel.

The length of bit synchronous signals on the main channel, sent from the sender wireless communication device 100, is set shorter than that on the sub-channels. Thus, at the receiver communication device 200, under the control of channel switching controller 31, the time period for receive-waiting on the main channel is set longer than the time period for receive-waiting on the sub-channels.

Figure 12:
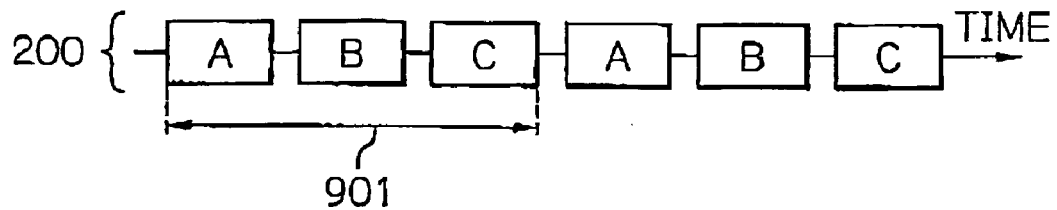
FIG. 12 is a time chart useful for understanding the operation of changing a receive-waiting period of time of each channel in the embodiment of the receiver wireless communication device shown in FIG. 3.
Figure 13:
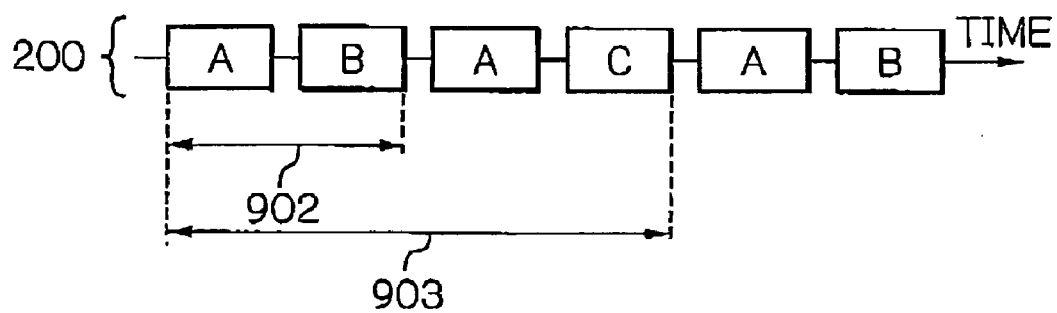
FIG. 13 is a time chart useful for understanding the operation of changing a receive-waiting period of time of each channel in the alternative embodiment of the receiver wireless communication device.

FIGS. 12 and 13 are descriptive diagrams illustrating the operation for changing receive-waiting channels in the receiver communication device 200. FIG. 12 shows for comparison the operation for changing receive-waiting channels on the embodiment previously described. FIG. 13 shows the operation for changing receive-waiting channels in the receiver communication device 200 of the instant alternative embodiment, which includes the communication controller 102 with its internal structure shown in FIG. 9.

In FIGS. 12 and 13, the receiver communication device 200 exemplarily uses three channels "A", "B" and "C". In FIG. 12, the receiver communication device 200 of the previously described embodiment balances the receive-waiting time equally between the channels "A", "B" and "C". For this purpose, as seen from FIG. 12, reception on the channels is cyclically waited for in the order of channels "A", "B", "C", "A" and so on. In this case, the length of the bit synchronous signal 901 taken when the signal is sent from the sender wireless communication device 100 is substantially equal to the total receive-waiting time for channels "A", "B" and "C".

By contrast, in the receiver communication device 200 of the instant alternative embodiment, the channel switching controller 31 waits for reception on the channels, as shown in FIG. 13, in the order of channel "A", "B", "A", "C", "A", "B" and so on, so that the receive-waiting time on the main channel "A" becomes longer than that of the sub-channels "B" and "C".

This alternative embodiment is thus adapted to take, among the lengths of bit synchronous signals sent from the sender wireless communication device 100, the length of a bit synchronous signal transmitted over the main channel 902 substantially equal to the total length of receive-waiting time consumed once on the main channel, i.e. one sub-channel. On the other hand, a bit synchronous signal length 903 consumed on a sub-channel takes one interval of the receive-waiting period within which the receiver communication device 200 can scan all channels.

The operation described above renders substantially higher the possibility in successful communication on main channel "A" on which the previous communication was free from radiowave interference. In addition, since the receive-waiting time of the sub-channels can be made shorter, the receiver wireless communication device 200 may reduce its power consumption.

As described above, according to the instant alternative embodiment, in addition to the advantages attained by the previous embodiment, the main channel which enabled the previous communication without radiowave interference is given a priority to perform data signal transmission processing, thereby shortening the duration required for transmitting bit synchronous signals. As a result, power saving and shorter delay of the wireless communication devices 100 and 200 are achieved.

In the illustrative embodiments described above, various methods for changing communication channels are applicable to the wireless communication devices 100 and 200.

For example, as previously described, such a method may be applicable that the order of selecting channels may be determined in advance and according to the order thus determined a channel is selected.

Further for instance, also applicable is a method for selecting a channel whose frequency bandwidth is most apart from the channel currently used, or another method for selecting a channel that is apart, by a specified frequency bandwidth, from the currently used channel. These methods allow a channel to be selected which is at least apart from the channel having a radiowave interference caused, thereby avoiding suffering from interference.

Figure 14:
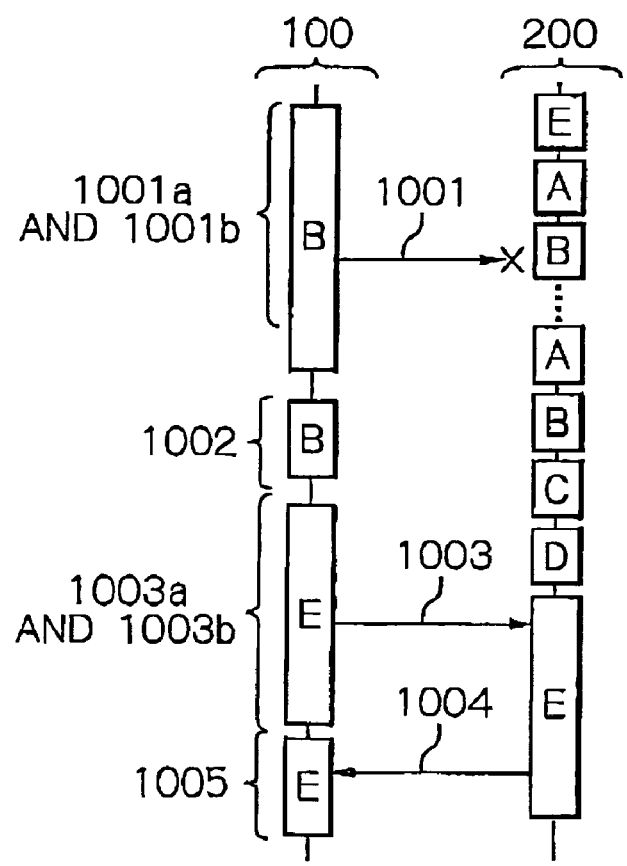
FIG. 14 shows a communication sequence when selecting a channel whose frequency bandwidth farthest from that of the channel in use.

The communication sequence executed in the above case is shown in FIG. 14. In this exemplary case, the wireless communication devices 100 and 200 use five channels "A", "B", "C", "D" and "E" with the bandwidths thereof arranged in the order of lower to higher frequencies.

In FIG. 14, the sender wireless communication device 100 sends on the channel "B" a bit synchronous signal 1001a and data signal 1001b (step 1001). In this example, a radiowave interference occurs with another device, not shown, causing a failure in data communication on the channel "B". The receiver communication device 200 in turn fails to normally detect a bit synchronous signal 1001a from the sender communication device 100, thus sending no data transmission ACK signal.

As a result, the sender communication device 100 fails to receive a data transmission ACK signal within the data transmission ACK signal receive-waiting period 1002, causing a timeout (step 1002).

Then, the sender wireless communication device 100, under the control of communication controller 102, preferably the retransmission controller 12 or the like, changes the sending channel to the channel "E" whose frequency bandwidth is most apart from that of the channel "B" Over the channel "E", a bit synchronous signal 1003a and a data signal 1003b are transmitted (step 1003).

If the receiver wireless communication device 200 succeeds in communication on the channel "E", then under the control of the communication controller 202, a data transmission ACK signal 1004 is sent to the sender wireless communication device 100 (step 1004). If the sender communication device 100 receives the data transmission ACK signal 1004 within the data transmission ACK signal receive-waiting time 1005, communication on the channel "E" is successfully performed.

Also applicable is another method for changing channels which makes in use a radiowave bandwidth which is of less possibility of being used by other communication systems.

For example, in an application where the wireless communication devices 100 and 200 are designed to use the IEEE802.15.4 standard as a communication instrument, when a radiowave interference is caused by a wireless LAN device, one channel used by the wireless LAN device would generally occupy the bandwidth corresponding to four channels of the IEEE802.15.4. In such an application, the illustrative embodiments may change, if a radiowave interference occurs, the currently used channel to another channel whose bandwidth is apart at least by the bandwidth corresponding to four channels to thereby avoid the radiowave interference.

Figure 15:
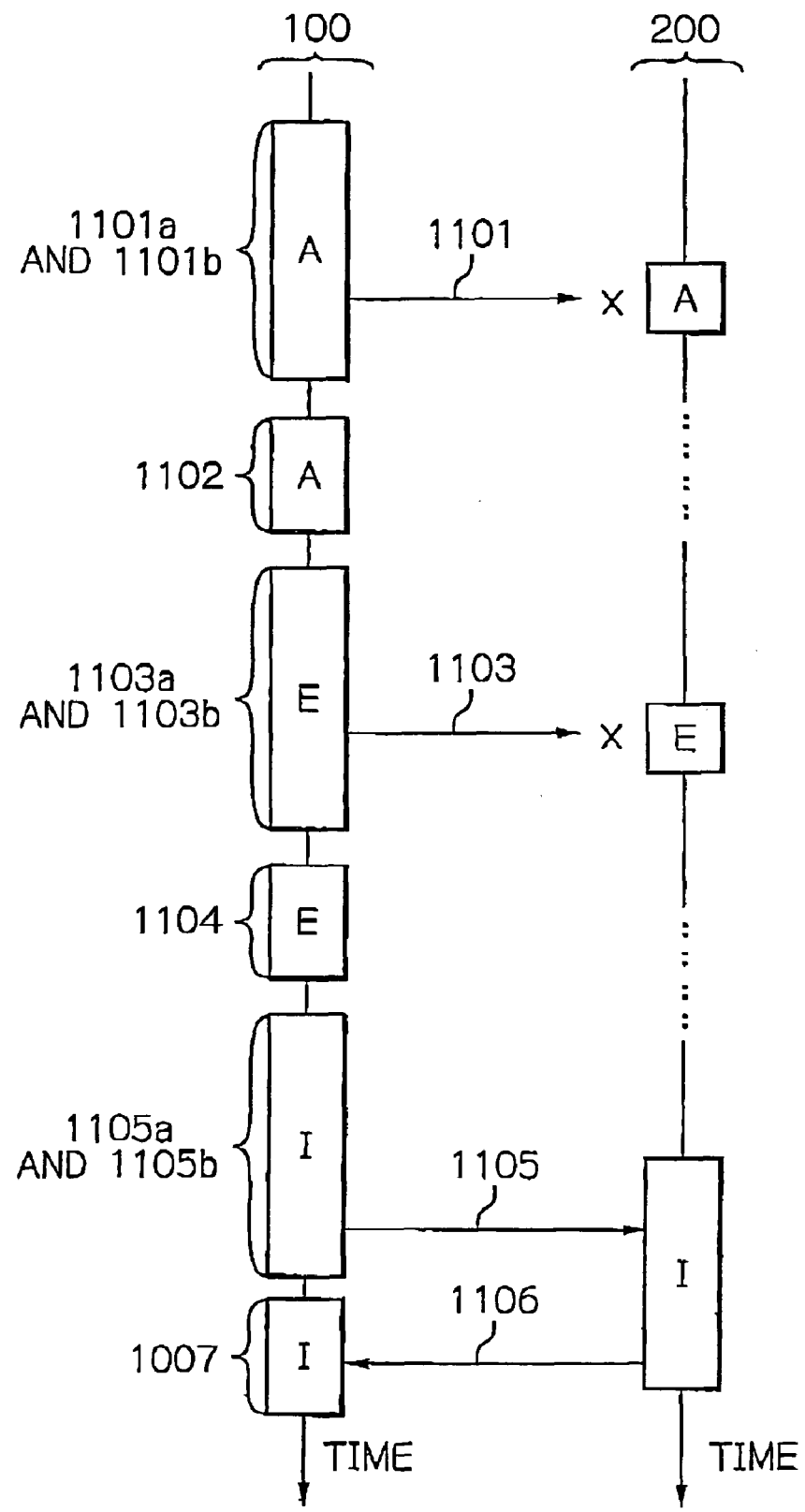
FIG. 15 shows a communication sequence when selecting a channel which is of less possibility in use by another communication system.

The communication sequence in this case is shown in FIG. 15. In this exemplified case, the wireless communication devices 100 and 200 use channels "A", "1", "C", "D" and "E" and so on arranged in the order of lower to higher frequency bandwidths.

In the example, the sender wireless communication device 100 sends on the channel "A" a bit synchronous signal 1101a and a data signal 1101b. A radiowave interference with another device, not shown, occurs so that data communication on the channel "A" failed (step 1101). Thus, the receiver communication device 200 fails to normally detect the bit synchronous signal 1101a sent from the sender communication device 100, and consequently sends no data transmission ACK signal.

Then, the sender communication device 100 fails to receive the data transmission ACK signal within its data transmission ACK signal receive-waiting period 1102, causing a timeout (step 1102).

The sender wireless communication device 100, under the control of the communication controller 102 or preferably of the retransmission controller 12, changes the sending channel to the channel "E" whose bandwidth is apart from the channel "B" by the frequency bandwidth equivalent to four channels. Then, a bit synchronous signal 1103a and a data signal 1103b are sent on the channel "E" (step 1103).

Now, when the channel "E" still suffers from a radiowave interference with another device, causing a failure in the communication on the channel "E" (step 1103), so that the sender communication device 100 fails to receive a data transmission ACK signal within the data transmission ACK signal receive-waiting period 1104, thus causing a timeout (step 1104) In that case, under the control of the communication controller 102 or preferably of the retransmission controller 12, the current sender channel is changed from the channel "E" to another channel "I" whose frequency bandwidth is apart by the bandwidth corresponding to four channels. On the channel "I", a bit synchronous signal 1105a and a data signal 1105b are sent (step 1105).

If the receiver wireless communication device 200 succeeds in communication on the channel "I", then under the control of the communication controller 202, a data transmission ACK signal 1006 is sent to the sender wireless communication device 100 (step 1006). When data transmission ACK signal 1006 is received by the sender communication device 100 within the data transmission ACK signal receive-waiting time 1007, communication on the channel "I" is normally completed.

The illustrative embodiments so far described are mere examples in which, for data signal transmission processing, a bit synchronous signal is sent prior to sending a data signal, and the receiver wireless communication device 200 determines, in response to the bit synchronous signal detected, whether or not the communication is available. The present invention is not restricted to the specific cases described above, but any kinds of packets such as data packets may be used to determine whether or not communication is available.

For example, data packets are analyzed in an application layer, and a sender communication device is determined, based on the analysis result, as to whether or not communication is available. In such a way, the present invention is applicable to the application layer.

Figure 16:
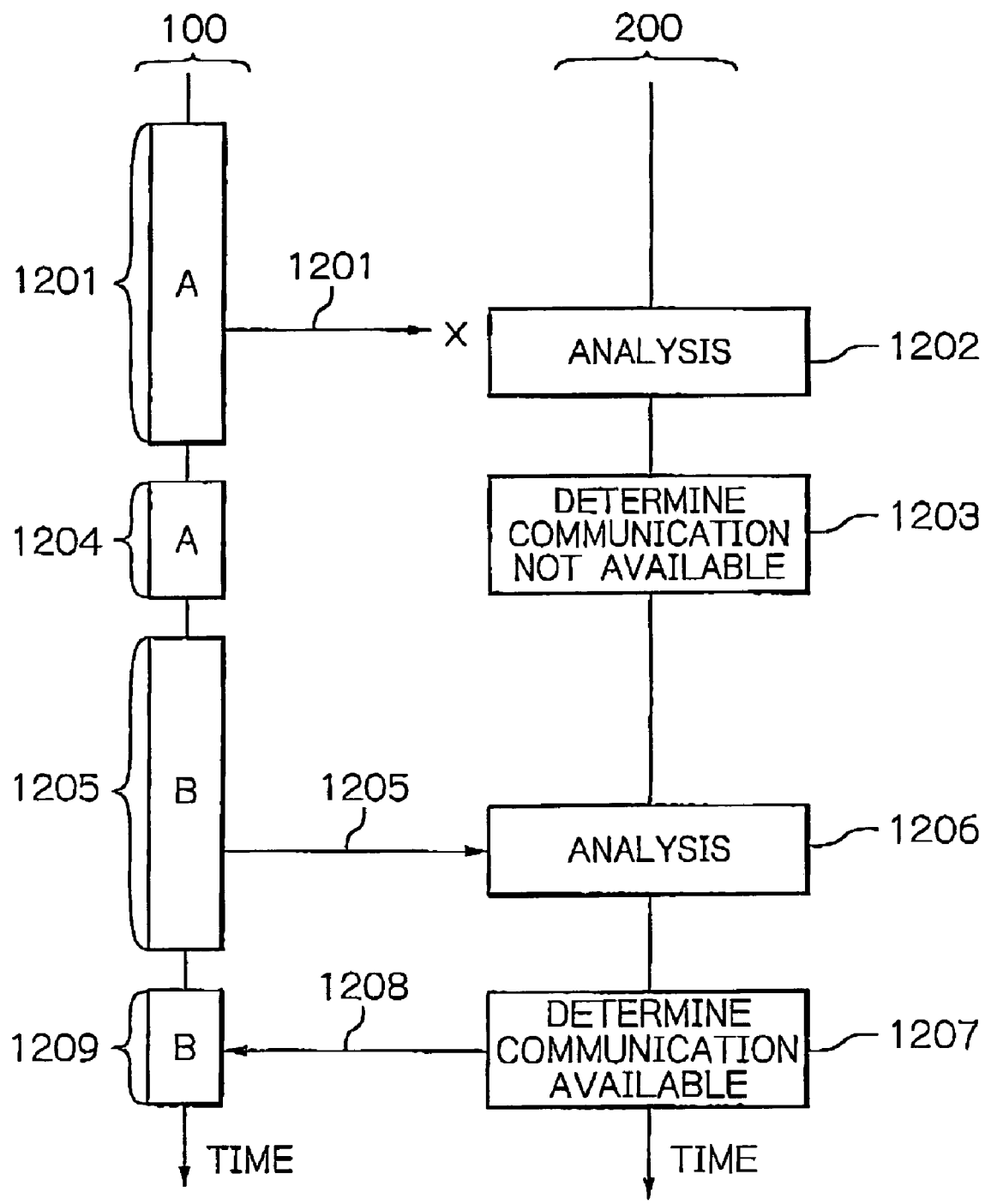
FIG. 16 shows a communication sequence in a case where a data packet analysis result is used to perform communication between a sender and a receiver communication device.

The communication sequence in this case stated above is shown in FIG. 16. At first, the sender wireless communication device 100 sends a data signal 1201 on the channel "A" (step 1201).

The application layer, for example, in the receiver communication device 200 analyzes a data packet (step 1202). As a result, unless it is determined that communication is available, a data transmission ACK signal cannot be sent (step 1203).

Thus, the sender communication device 100 fails to receive a data transmission ACK signal within the data transmission ACK signal receive-waiting period 1204, causing a timeout (step 1204).

In turn, the sender wireless communication device 100 changes a sending channel, preferably under the control of the communication controller 102 having the retransmission controller 12. In this example, the sending channel changes from channel "A" to channel "B".

If the sender wireless communication device 100 has changed the sending channel, then under the control of the communication controller 102, a bit synchronous signal 603a and a data signal 603b are sent on the channel "B" (step 1205).

If the application layer in the receiver communication device 200 analyzes data packets retransmitted (step 1206) and resultantly determines that communication is available (step 1207), then a data transmission ACK signal 1208 is sent under the control of the communication controller 202 to the sender wireless communication device 100. If the data transmission ACK signal 1208 is received by the sender communication device 100 within the data transmission ACK signal receive-waiting time 1209, communication on the channel "B" is normally performed.

In the alternative embodiment described above, the sender and receiver wireless communication devices 100 and 200 set as the main channel the current communication channel on which communication has been successful without radiowave interferences. The system may be adapted so that, if thereafter this main channel suffers a radiowave interference, the channel setter 21 in the communication controller 102 may change the main channel. In the latter case, the method of changing the main channel may be the same as previously described for setting the main channel.

The functions of the wireless communication devices 100 and 200 in both illustrative embodiments can be implemented in the form of programmed software sequences. For example, the wireless communication devices 100 and 200 may include hardware, comprising a processor system such as a CPU (Central Processor Unit) and a storage device such as a ROM (Read-Only Memory), a RAM (Random Access Memory) and an EEPROM (Electrically Erasable and Programmable ROM). The processor system is adapted to read out communication control programs stored in the storage device, and executes the communication control programs with data necessary for the processing used, thus implementing various functions.

The entire disclosure of Japanese patent application No. 2008-17994 filed on Jan. 29, 2008, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A communication apparatus for communication with a receiver communication device over a plurality of communication channels, the receiver communication device scanning the plurality of communication channels during a receive-waiting time, the apparatus comprising:
   a communication unit for communicating with the receiver communication device, and sending communication signals, including a bit synchronous signal and a data signal, to the receiver communication device, via one of the plurality of communication channels; and
   a communication controller sending a control signal to the communication unit to control the communication of the communication unit, such that the communication unit sends the bit synchronous signal with a length thereof being substantially equal to or longer than the receiving-waiting time.

2. The apparatus according to claim 1, wherein the communication unit sends the data signal a predetermined length of time after sending the bit synchronous signal.

3. The apparatus according to claim 1, wherein the communication signals include an information packet.

4. The apparatus according to claim 1, wherein said communication controller comprises:
   a communication confirmation unit for checking whether or not the communication signals are successfully transmitted; and
   a retransmission controller for selecting, if said communication confirmation unit determines that the communication signals are not successfully transmitted, a second one of the plurality of communication channels which is to be used for communication, and using the selected communication channel for retransmission.

5. The apparatus according to claim 4, wherein the second communication channel is separated from the one communication channel, determined as failing to transmit the communication signals, by a predetermined bandwidth.

6. The apparatus according to claim 4, wherein, if the communication fails, said retransmission controller selects a second one of the plurality of communication channels that is not used by another communication system.

7. The apparatus according to claim 1, wherein said communication controller further comprises a channel setter, the channel setter selecting, among the plurality of communication channels, a first communication channel, used as a first choice for communication, and a second communication channel other than the first communication channel, the bit synchronous signal being set by the channel setter, when the second communication channel is used for transmission of the bit synchronous signal, at a second signal length substantially equal to or longer than the receive-waiting time, and when the first communication channel is used for transmission of the bit synchronous signal, at a first signal length shorter than the second signal length.

8. The apparatus according to claim 7, wherein the first signal length is substantially equal to or longer than the length of a receive confirmation period for the first communication channel in the receiver communication device.

9. The apparatus according to claim 7, wherein the second communication channel is provided in plural, said communication controller selecting one of the second communication channels to perform, if the communication on the first communication channel fails, a retransmission on the second communication channel selected.

10. The apparatus according to claim 7, wherein the second communication channel is apart from the first communication channel by a predetermined bandwidth.

11. The apparatus according to claim 7, wherein, if communication via the first communication channel fails, said communication controller selects the second communication channel not being used by another communication system.

12. The apparatus according to claim 7, wherein the communication unit sends the data signal a predetermined length of time after sending the bit synchronous signal.

13. The apparatus according to claim 7, wherein the communication signals include an information packet.

14. A communication apparatus for communication with a sender communication device over a plurality of communication channels, the sender communication device sending communication signals including a bit synchronous signal to the communication apparatus, the apparatus comprising:
   a communication unit for receiving the communication signals; and
   a communication controller sending a control signal to the communication unit to control the communication of the communication unit, so as to allocate a receive-waiting time to each of the plurality of communication channels to sequentially scan the communication channels, predetermined first one of the communication channels having a receive-waiting time substantially longer than that of a second one of the communication channels.

15. The communication apparatus according to claim 14, wherein said communication controller sets as the first communication channel a communication channel on which communication with the sender communication device is successfully performed.

16. A method of communicating with a receiver communication device over a plurality of communication channels, the receiver communication device scanning the plurality of communication channels during a receive-waiting time, the method comprising the steps of:
   selecting one of the plurality of communication channels for use in the communication, and transmitting communication signals, including a bit synchronous signal and a data signal, to the receiver communication device via the one communication channel; and controlling setting of the plurality of communication channels, and sending the bit synchronous signal with a signal length substantially equal to or longer than the receive-waiting time.

17. A method of communicating with a sender communication device over a plurality of communication channels, the sender communication device sending communication signals including a bit synchronous signal, the method comprising the steps of:

receiving the communication signals; and controlling switching of the communication channels, and allocating a receive-waiting time to each of the plurality of communication channels for sequential scanning of the communication channels, a predetermined first one of the communication channels having a receive-waiting time substantially larger than that of a second one of the communication channels.

18. A communication program product for communication with a receiver communication device over a plurality of communication channels, the receiver communication device scanning the plurality of communication channels during a receive-waiting time, the communication program product comprising:

a storage device having computer usable program code embodied therewith, the computer usable program code including:

instructions to select one of a plurality of communication channels, and to send communication signals including a bit synchronous signal and a data signal, to the receiver communication device via the one communication channel; and instructions to control a setting of the plurality of communication channels, and to send the bit synchronous signal with a signal length substantially equal to or longer than the receive-waiting time.

19. A communication program product for communicating with a sender communication device over a plurality of communication channels, the sender communication device sending communication signals including a bit synchronous signal, the communication program product comprising:

a storage device having computer usable program code embodied therewith, the computer usable program code including:

instructions to receive communication signals; and instructions to control switching of the communication channels and to allocate a receive-waiting time to each of the plurality of communication channels for sequential scanning of the communication channels, a predetermined first one of the communication channels having a receive-waiting time substantially longer than that of a second one of the communication channels.

* * * * *